(12) United States Patent
Asano

(10) Patent No.: US 11,954,839 B2
(45) Date of Patent: Apr. 9, 2024

(54) LEAK SOURCE SPECIFICATION ASSISTANCE DEVICE, LEAK SOURCE SPECIFICATION ASSISTANCE METHOD, AND LEAK SOURCE SPECIFICATION ASSISTANCE PROGRAM

(71) Applicant: Konica Minolta, Inc., Tokyo (JP)

(72) Inventor: Motohiro Asano, Osaka (JP)

(73) Assignee: KONICA MINOLTA, INC., Tokyo (JP)

(*) Notice: Subject to any disclaimer, the term of this patent is extended or adjusted under 35 U.S.C. 154(b) by 393 days.

(21) Appl. No.: 17/296,765

(22) PCT Filed: Sep. 9, 2019

(86) PCT No.: PCT/JP2019/035311
§ 371 (c)(1),
(2) Date: May 25, 2021

(87) PCT Pub. No.: WO2020/110410
PCT Pub. Date: Jun. 4, 2020

(65) Prior Publication Data
US 2022/0028051 A1 Jan. 27, 2022

(30) Foreign Application Priority Data
Nov. 27, 2018 (JP) .................. 2018-221215

(51) Int. Cl.
*G06T 7/00* (2017.01)
*G01M 3/04* (2006.01)
(Continued)

(52) U.S. Cl.
CPC ............. *G06T 7/0004* (2013.01); *G01M 3/04* (2013.01); *G06T 7/20* (2013.01); *G06T 7/70* (2017.01); *G06T 2207/30108* (2013.01)

(58) Field of Classification Search
CPC . G01M 3/04; G01M 3/38; G06T 2207/30108; G06T 7/0004; G06T 7/20; G06T 7/70
See application file for complete search history.

(56) References Cited

U.S. PATENT DOCUMENTS

2018/0364185 A1* 12/2018 Asano ................ G01N 21/3504
2020/0116583 A1* 4/2020 Hedberg .................. H04N 5/33

FOREIGN PATENT DOCUMENTS

| JP | H10019919 A | 1/1998 |
| WO | 2016208317 A1 | 12/2016 |

OTHER PUBLICATIONS

Hirahara, , A machine translated English version of WO 2016/208317. (Year: 2016).*

(Continued)

*Primary Examiner* — Ruiping Li
(74) *Attorney, Agent, or Firm* — CANTOR COLBURN LLP

(57) ABSTRACT

A leak source specification assistance device includes a processing unit that performs processing, based on a movement of a first pixel that is one of pixels constituting an image including a leaking fluid region (gas region), to determine a second pixel that is one of the pixels constituting the image and is a movement source pixel of the first pixel, and repeats the processing with the second pixel newly set as the first pixel to determine a final movement source pixel. The processing unit repeats the processing on each of a plurality of the pixels constituting the image to determine the final movement source pixel for each of the plurality of pixels.

19 Claims, 13 Drawing Sheets

(51) Int. Cl.
G06T 7/20 (2017.01)
G06T 7/70 (2017.01)

(56) References Cited

OTHER PUBLICATIONS

International Search Report for International Application No. PCT/JP2019/035311, dated Oct. 29, 2019.
PCT Written Opinion of the International Searching Authority for International Application No. PCT/JP2019/035311, dated Oct. 29, 2019.

* cited by examiner

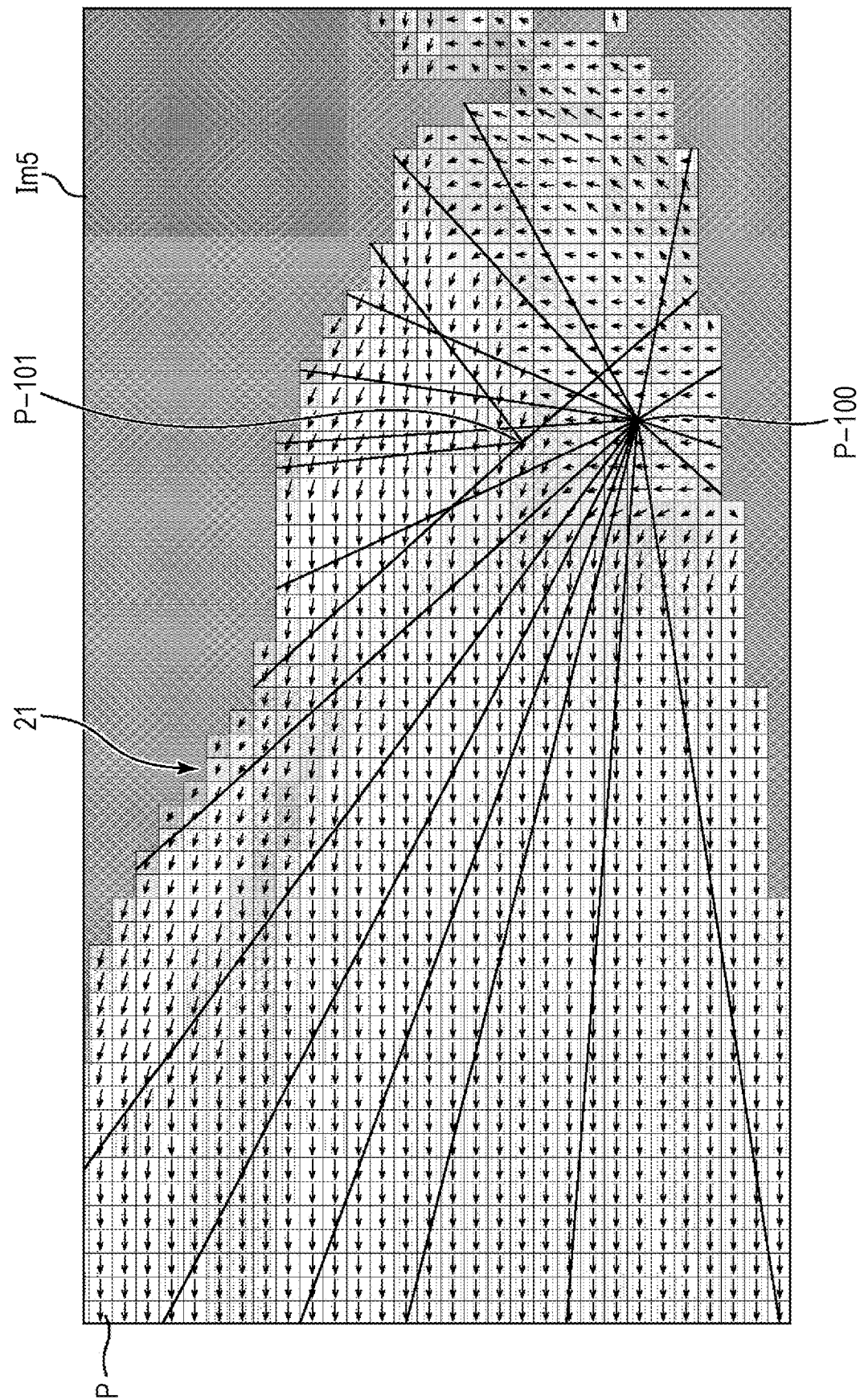

LEAK SOURCE SPECIFICATION ASSISTANCE DEVICE, LEAK SOURCE SPECIFICATION ASSISTANCE METHOD, AND LEAK SOURCE SPECIFICATION ASSISTANCE PROGRAM

CROSS REFERENCE TO RELATED APPLICATIONS

This is the U.S. national stage of application No. PCT/JP2019/035311, filed on Sep. 9, 2019. Priority under 35 U.S.C. § 119(a) and 35 U.S.C. § 365(b) is claimed from Japanese Application No. 2018-221215, filed Nov. 27, 2018, the disclosure of which is also incorporated herein by reference.

TECHNICAL FIELD

The present invention relates to a technique for assisting the specification of the leak source of a leaking fluid.

BACKGROUND ART

When the leak of a fluid (e.g. a gas) occurs, it is necessary to specify the leak source and repair the leak portion. Techniques that allow the detection of leak sources include, for example, a fluid leakage spot detection device disclosed in Patent Literature 1. This device includes an image acquisition unit that acquires a plurality of time-series images obtained by imaging a target region, a movement path calculation unit that determines the movement path of a leakage fluid which exists outside a fluid housing part housing the fluid, based on the plurality of time-series images acquired by the image acquisition unit, and a leakage spot calculation unit that determines a leakage spot at which the leakage fluid leaks from the fluid housing part, based on the movement path determined by the movement path calculation unit.

The present inventor has studied a technique that allows relatively easy assist of the specification of a leak source based on an image including a leaking fluid region (e.g. a gas region), on a principle different from that of the technique of Patent Literature 1.

CITATION LIST

Patent Literature

Patent Literature 1: WO 2016/208317 A

SUMMARY OF INVENTION

It is an object of the present invention to provide a leak source specification assistance device, a leak source specification assistance method, and a leak source specification assistance program that allow relatively easy assistance of the specification of a leak source based on an image including a leaking fluid region.

In order to achieve the above-mentioned object, a leak source specification assistance device reflecting one aspect of the present invention includes a processing unit. The processing unit performs processing, based on a movement of a first pixel that is one of pixels constituting an image including a leaking fluid region, to determine a second pixel that is one of the pixels constituting the image and is a movement source pixel of the first pixel, and repeats the processing with the second pixel newly set as the first pixel to determine a final movement source pixel. Then, the processing unit repeats the processing on each of a plurality of the pixels constituting the image to determine the final movement source pixel for each of the plurality of pixels.

Advantages and features provided by one or more embodiments of the invention are fully understood from detailed description provided below and the accompanying drawings. The detailed description and accompanying drawings are provided by way of example only, and are not intended as definitions of the limits of the present invention.

BRIEF DESCRIPTION OF DRAWINGS

FIG. 15 is an explanatory diagram illustrating a relationship between each pixel in the gas region and a final movement source pixel in the image shown in FIG. 7.

DESCRIPTION OF EMBODIMENTS

Figure 1A:
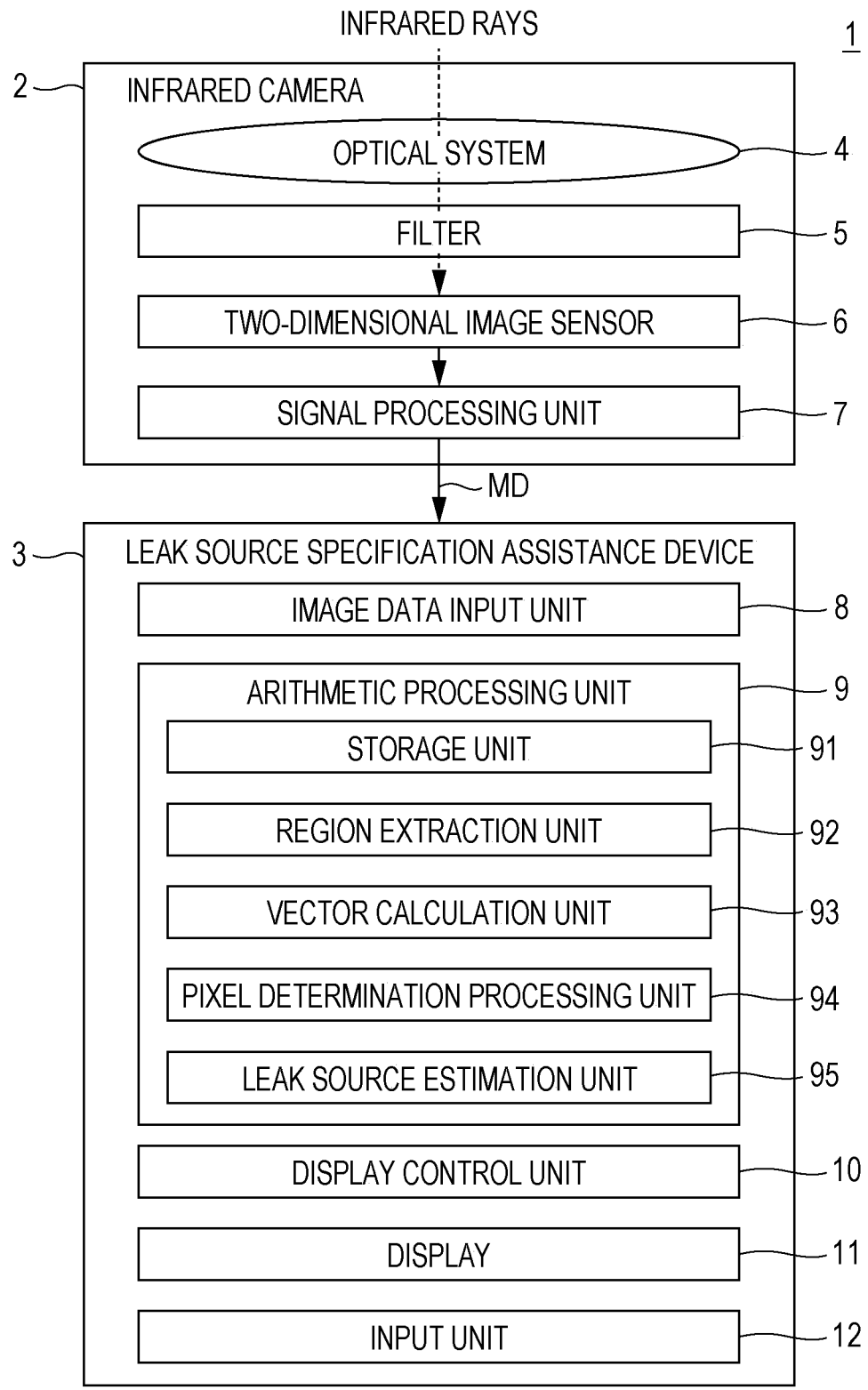
FIG. 1A is a block diagram showing a configuration of a leak source specification assistance system according to an embodiment.

Hereinafter, one or more embodiments of the present invention will be described with reference to the drawings. However, the scope of the invention is not limited to the disclosed embodiments.

In the drawings, components to which the same reference symbol is assigned mean that they are the same component, and the details of the component that have already been described will not be described. In the present description, a generic term is indicated by a reference symbol without a hyphen (e.g. an image Im2). When an individual component is referred to, it is indicated by a reference symbol with a hyphen (e.g. an image Im2-1).

FIG. 1A is a block diagram showing a configuration of a leak source specification assistance system 1 according to an embodiment. The leak source specification assistance system 1 includes an infrared camera 2 and a leak source specification assistance device 3. The embodiment is described with a gas as an example of a leaking fluid, but the leaking fluid may be a liquid.

The infrared camera 2 takes a video of infrared images of a subject including a gas leak monitoring target (e.g. a location where gas transport pipes are connected to each other), and generates video data MD indicating the video. It only needs to be a plurality of infrared images captured in time series, and is not limited to a video. The infrared camera 2 includes an optical system 4, a filter 5, a two-dimensional image sensor 6, and a signal processing unit 7.

The optical system 4 forms an infrared image of the subject on the two-dimensional image sensor 6. The filter 5 is disposed between the optical system 4 and the two-dimensional image sensor 6, and passes only infrared rays of a specific wavelength of light that has passed through the optical system 4. Of the infrared wavelength band, a wavelength band passed through the filter 5 depends on the type of gas to be detected. For methane, for example, the filter 5 that passes a wavelength band of 3.2 to 3.4 μm is used. The two-dimensional image sensor 6 is, for example, a cooled indium antimonide (InSb) image sensor, and receives infrared rays that have passed through the filter 5. The signal processing unit 7 converts an analog signal output from the two-dimensional image sensor 6 into a digital signal, and performs known image processing. The digital signal is the video data MD.

The leak source specification assistance device 3 is a personal computer, a smartphone, a tablet terminal, or the like, and includes, as functional blocks, an image data input unit 8, an arithmetic processing unit 9, a display control unit 10, a display 11, and an input unit 12.

The image data input unit 8 is a communication interface that communicates with a communication unit (not shown) of the infrared camera 2. The video data MD sent from the communication unit of the infrared camera 2 is input to the image data input unit 8. The image data input unit 8 sends the video data MD to the arithmetic processing unit 9.

The arithmetic processing unit 9 performs processing required to assist the specification of a gas leak source, using the video data MD. The arithmetic processing unit 9 includes a storage unit 91, a region extraction unit 92, a vector calculation unit 93, a pixel determination processing unit 94, and a leak source estimation unit 95.

The storage unit 91 stores the video data MD, various programs required to assist the specification of a gas leak source, etc. The region extraction unit 92 performs image processing on infrared images and extracts a gas region from the infrared images. The gas region is an example of a leaking fluid region. The vector calculation unit 93 calculates movement vectors of pixels constituting an image Im2 (FIG. 4) described later.

The pixel determination processing unit 94 (processing unit) performs processing, based on the movement of a first pixel that is one of pixels constituting an image including a gas region, to determine a second pixel that is one of the pixels constituting the image and is a movement source pixel of the first pixel, and repeats the processing with the second pixel newly set as the first pixel to determine a final movement source pixel. The pixel determination processing unit 94 repeats the processing on each of a plurality of the pixels constituting the image, to determine the final movement source pixel for each of the plurality of pixels. The second pixel is desirably located in the vicinity of the first pixel. For example, there may be no pixel between the first pixel and the second pixel, or there may be a few pixels between the first pixel and the second pixel.

The plurality of pixels may be, for example, all pixels in the image including the gas region, pixels selected from among all the pixels in the image, all pixels in the gas region, or pixels selected from among all the pixels in the gas region. The number of the final movement source pixels is less than or equal to the number of the plurality of pixels. For example, assume that the plurality of pixels is three pixels. The final movement source pixels of the three pixels may be different from each other or may be the same, or the final movement source pixels of two of the three pixels may be the same.

The user may specify the leak source using the respective final movement source pixels of the plurality of pixels, or as described next, the leak source estimation unit 95 may estimate the leak source based on the respective final movement source pixels of the plurality of pixels. The user can specify the leak source using this estimation.

The leak source estimation unit 95 (estimation unit) estimates that among the respective final movement source pixels of the plurality of pixels constituting the image, the most frequent final movement source pixel is the location of the gas leak source.

The display control unit 10 causes the display 11 to display a video indicated by the video data MD and an image that has undergone arithmetic processing by the arithmetic processing unit 9 (for example, an image that has undergone gas region extraction processing).

The input unit 12 receives various inputs related to the assistance for specifying the gas leak source. Although the leak source specification assistance device 3 according to the embodiment includes the display control unit 10, the display 11, and the input unit 12, the leak source specification assistance device 3 that does not include these will do.

Figure 1B:
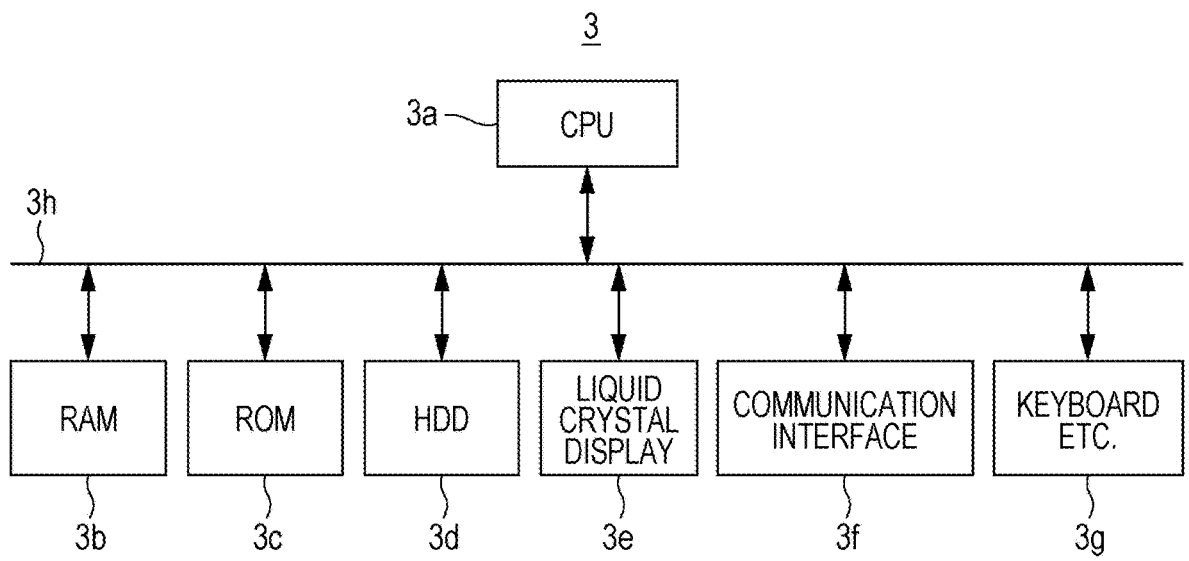
FIG. 1B is a block diagram showing a hardware configuration of a leak source specification assistance device shown in FIG. 1A.

FIG. 1B is a block diagram showing a hardware configuration of the leak source specification assistance device 3 shown in FIG. 1A. The leak source specification assistance device 3 includes a central processing unit (CPU) 3a, random-access memory (RAM) 3b, read-only memory (ROM) 3c, a hard disk drive (HDD) 3d, a liquid crystal display 3e, a communication interface 3f, a keyboard etc. 3g, and a bus 3h connecting them. The liquid crystal display 3e is hardware that implements the display 11. Instead of the liquid crystal display 3e, an organic light-emitting diode display (organic EL display), a plasma display, or the like may be used. The communication interface 3f is hardware that implements the image data input unit 8. The keyboard etc. 3g is hardware that implements the input unit 12. A touch panel may be used instead of the keyboard.

The HDD 3d stores, for the arithmetic processing unit 9 and the display control unit 10, programs to implement these functional blocks and various data (e.g. the video data MD). The program to implement the arithmetic processing unit 9 is an arithmetic processing program to acquire the video data MD and assist the specification of a gas leak source using the video data MD. The program to implement the display control unit 10 is, for example, a display control program to display a video indicated by the video data MD on the display 11 and display an image that has undergone arithmetic processing by the arithmetic processing unit 9 on the display 11. These programs are stored in the HDD 3d in advance, but are not limited to this. For example, a recording medium (e.g. an external recording medium such as a magnetic disk or an optical disk) in which these programs are recorded may be prepared, and the programs stored in this recording medium may be stored in the HDD 3d. These programs may be stored in a server connected to the leak source specification assistance device 3 via a network, and these programs may be sent to the HDD 3d via the network and stored in the HDD 3d. These programs may be stored in the ROM 3c instead of in the HDD 3d. The leak source specification assistance device 3 may include flash memory instead of the HDD 3d, and these programs may be stored in the flash memory.

The CPU 3a reads these programs from the HDD 3d, loads them into the RAM 3b, and executes the loaded programs to implement the arithmetic processing unit 9 and the display control unit 10. However, for the function of the arithmetic processing unit 9 and the function of the display control unit 10, part or all of each function may be implemented by processing by a digital signal processor (DSP) in place of or in combination with the processing by the CPU 3a. Likewise, part or all of each function may be implemented by processing by a dedicated hardware circuit in place of or in combination with processing by software.

The arithmetic processing unit 9 includes a plurality of elements shown in FIG. 1A. Thus, the HDD 3d stores programs for implementing these elements. That is, the HDD 3d stores programs for implementing the region extraction unit 92, the vector calculation unit 93, the pixel determination processing unit 94, and the leak source estimation unit 95. These programs are expressed as a region extraction program, a vector calculation program, a pixel determination processing program, and a leak source estimation program.

These programs are expressed using the definitions of the elements. The leak source estimation unit 95 and the leak source estimation program will be described as an example. The leak source estimation unit 95 estimates that among the respective final movement source pixels of a plurality of pixels constituting an image, the most frequent final movement source pixel is the location of a leak source. The leak source estimation program is a program to estimate that among the respective final movement source pixels of a plurality of pixels constituting an image, the most frequent final movement source pixel is the location of a leak source.

A flowchart of these programs (the region extraction program, the vector calculation program, etc.) executed by the CPU 3a is FIG. 2 described next.

The operation of the leak source specification assistance device 3 will be described, using, as an example, the video data MD of infrared images obtained by imaging an outdoor test site using the infrared camera 2. FIG. 2 is a flowchart illustrating this operation. FIG. 3 is an image diagram in which four frames selected from a group of frames constituting the video data MD of the infrared images are aligned in time series. The test site includes a point SP where a gas can be ejected. The gas is being ejected at the point SP. An image Im1-1 is an infrared image (frame) captured at a time T1. An image Im1-2 is an infrared image (frame) captured at a time T2 0.2 seconds after the time T1. An image Im1-3 is an infrared image (frame) captured at a time T3 0.4 seconds after the time T1. An image Im1-4 is an infrared image (frame) captured at a time T4 0.6 seconds after the time T1.

Figure 4:
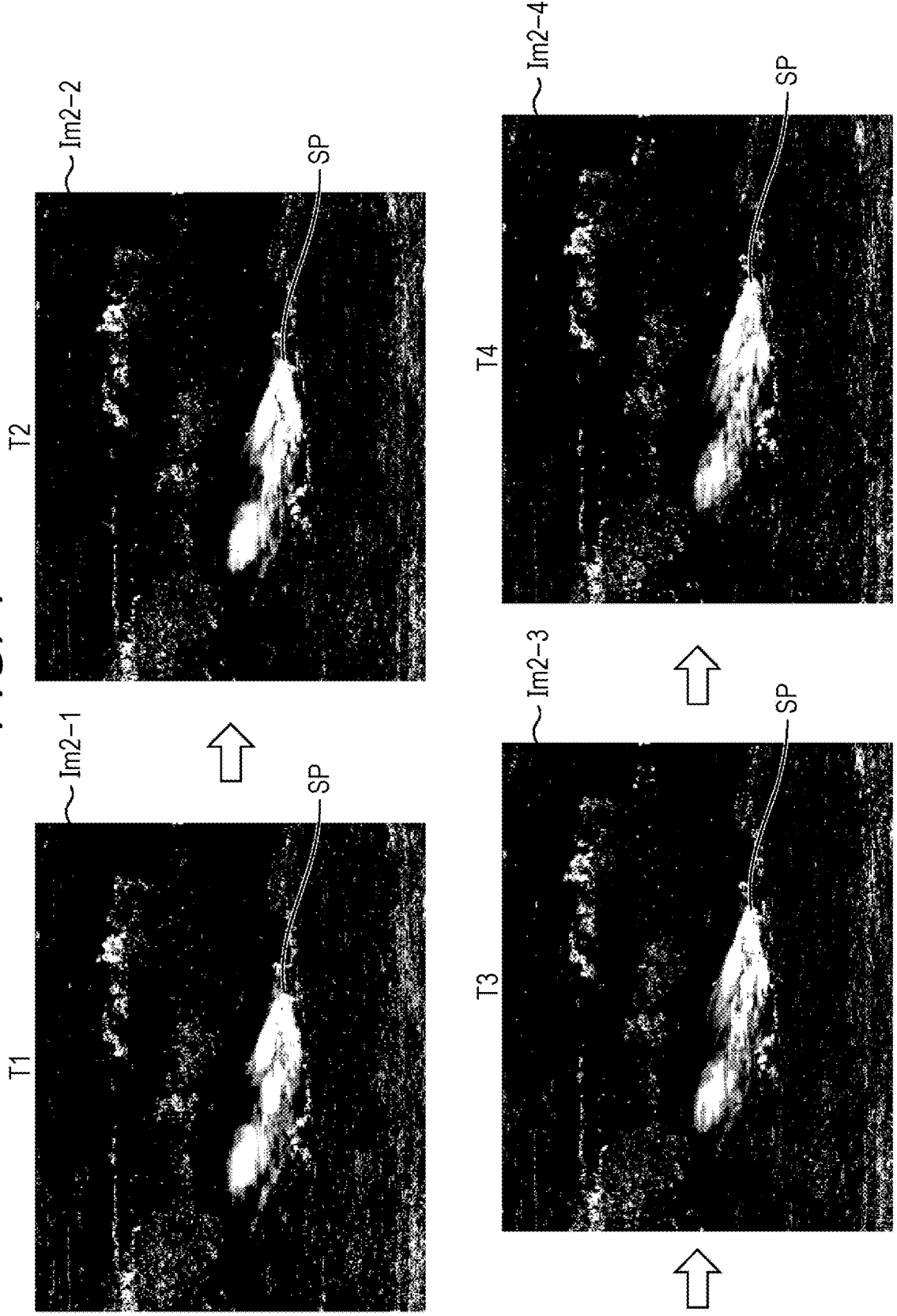
FIG. 4 is an image diagram showing, in time series, images that have undergone image processing to make a gas region easier to see.

From the images Im1 (infrared images), a gas region (here, the gas region is a region showing the gas ejected from the point SP and floating in the test site) is unclear. Therefore, the region extraction unit 92 (FIG. 1A) extracts the gas region included in the images Im1 (step S1 in FIG. 2). The details will be described. The region extraction unit 92 performs image processing to make it easier to see the gas region included in each image Im1. FIG. 4 is an image diagram showing, in time series, images Im2 that have undergone this image processing.

Referring to FIG. 3 and FIG. 4, an image Im2-1 is an image that has undergone the image processing to make it easier to see the gas region included in the image Im1-1. An image Im2-2 is an image that has undergone the image processing to make it easier to see the gas region included in the image Im1-2. An image Im2-3 is an image that has undergone the image processing to make it easier to see the gas region included in the image Im1-3. An image Im2-4 is an image that has undergone the image processing to make it easier to see the gas region included in the image Im1-4. A white region extending in the centers of the images Im2 is the gas region. It can be seen that the gas originating at the point SP is flowing from right to left. In the images Im2, the right side is windward and the left side is leeward. The gas region is, in other words, an image of a gas cloud.

A known technique can be applied to the image processing to make the gas region easier to see. For example, the known technique is disclosed in WO 2017/073430 A. This internationally published technique is a technique invented by the present inventor et al. Specifically, disclosed is an image processing device for gas detection that performs image processing on infrared images of a gas-leak monitoring target captured at a plurality of times. The image processing device for gas detection includes an image processing unit that performs processing to remove, from image data representing the infrared images, second frequency component data that has a lower frequency than first frequency component data representing temperature variations due to leaked gas, and represents temperature variations in the background of the monitoring target.

Although it is not a technique invented by the present inventor et al., JP 2012-058093 A, for example, discloses a gas leak detection apparatus that detects a gas leak in a region under inspection. The gas leak detection apparatus includes an infrared camera that captures images of the region under inspection, and an image processing unit that processes infrared images captured by the infrared camera. The image processing unit includes a fluctuation extraction unit that extracts dynamic fluctuations caused by a gas leak from a plurality of infrared images aligned in time series.

The region extraction unit 92 selects images Im2 that constitute a predetermined-period (e.g. one-second) video from among the images Im2 aligned in time series. For example, the region extraction unit 92 selects the image Im2-1 at the time T1, the image Im2-2 at the time T2 0.2 seconds after the time T1, the image Im2-3 at the time T3 0.4 seconds after the time T1, the image Im2-4 at the time T4 0.6 seconds after the time T1, and an image Im2-5 (not shown) at a time T5 0.8 seconds after the time T1.

Figure 5:
FIG. 5 is an image diagram showing an example of an image composed of maximum pixel values.

The region extraction unit 92 generates an image Im3 composed of maximum pixel values, using these images Im2 (the images Im2-1 to Im2-5). FIG. 5 is an image diagram showing an example of the image Im3. The generation of the image Im3 will be described in detail. The region extraction unit 92 determines, from among the pixels located at the same sequence number in these images Im2, the maximum value of values indicated by the pixels. The region extraction unit 92 sets this maximum value as the value of the pixel located at the above sequence number in the image Im3. Specifically, the region extraction unit 92 determines the maximum value of values indicated by the first pixels in these images Im2, and sets this value as the value of the first pixel in the image Im3. The region extraction unit 92 determines the maximum value of values indicated by the second pixels in these images Im2, and sets this value as the value of the second pixel in the image Im3. The region extraction unit 92 performs the same processing on the third and subsequent pixels.

Figure 6:
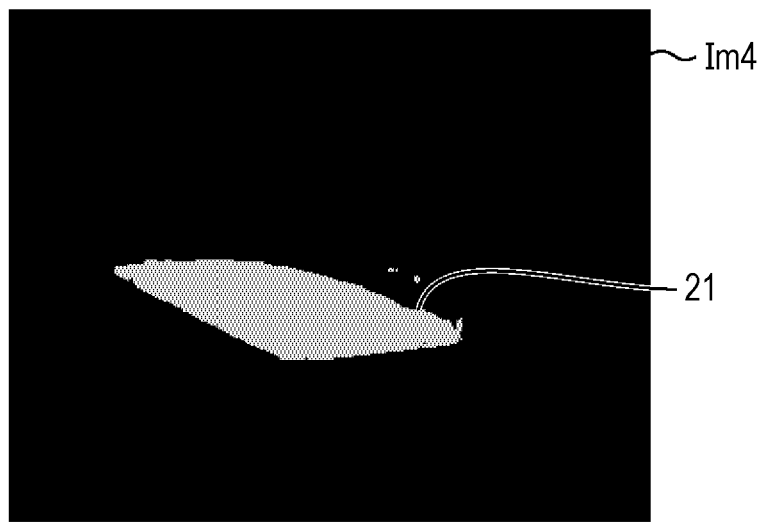
FIG. 6 is an image diagram showing an example of an image obtained by performing noise removal and binarization processing on the image shown in FIG. 5.

The region extraction unit 92 performs noise removal and binarization processing on the image Im3 to generate an image Im4. FIG. 6 is an image diagram showing an example of the image Im4. The image Im4 is an image in which a gas region 21 (an example of a leaking fluid region) is extracted.

A method to extract the gas region 21 is not limited to the above-mentioned method. The user may specify the gas region 21. This eliminates the need to extract the gas region 21.

Figure 2:
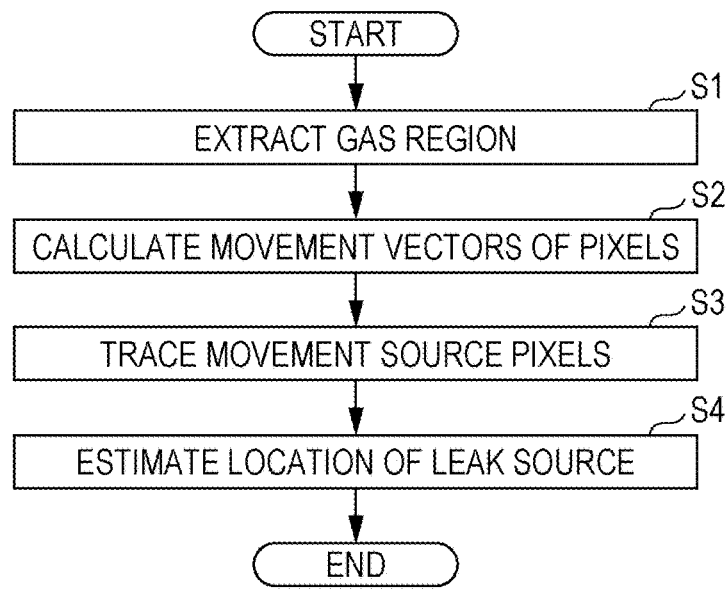
FIG. 2 is a flowchart illustrating operation of the leak source specification assistance device according to the embodiment.
Figure 3:
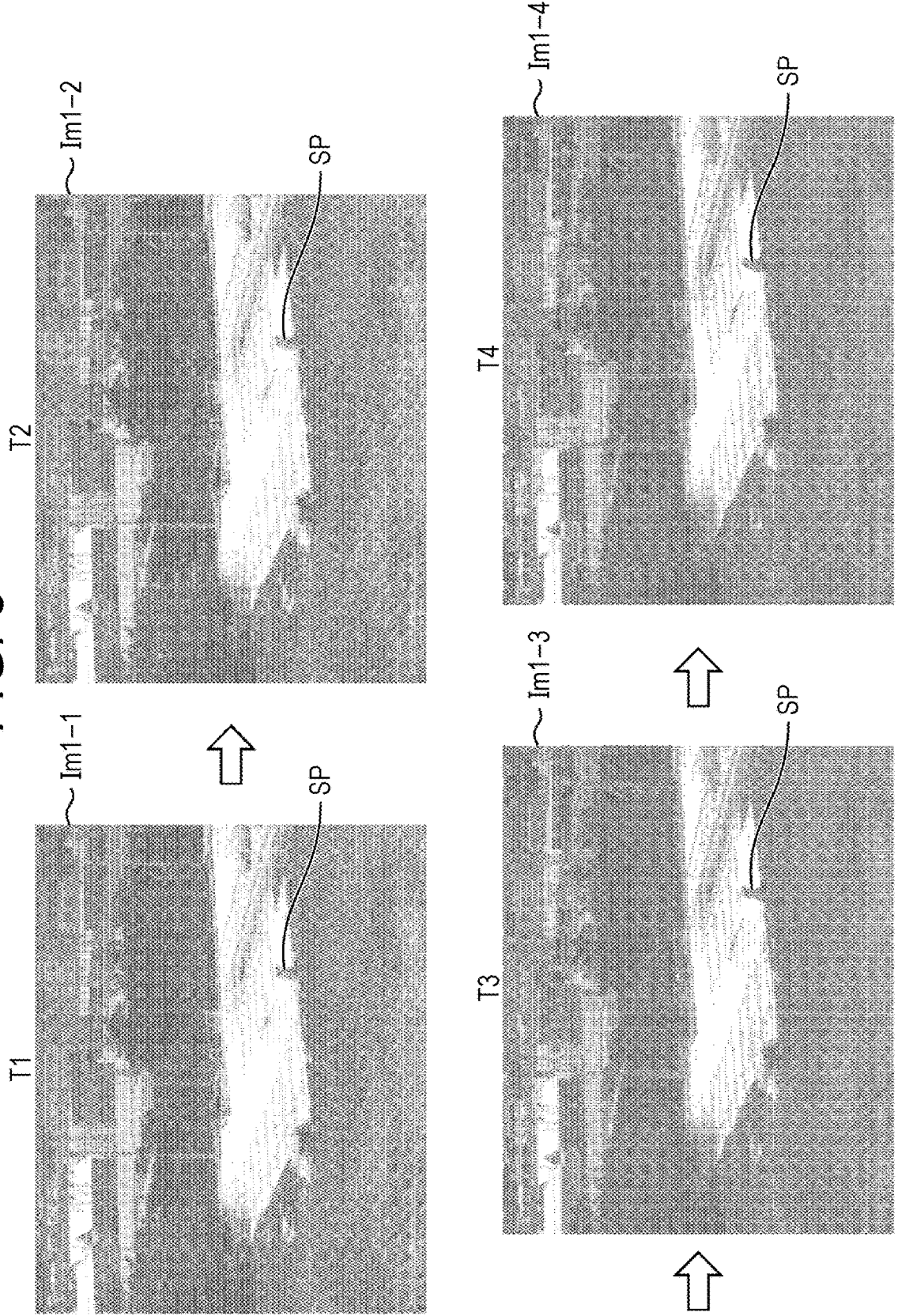
FIG. 3 is an image diagram in which four frames selected from a group of frames constituting video data of infrared images are aligned in time series.
Figure 7:
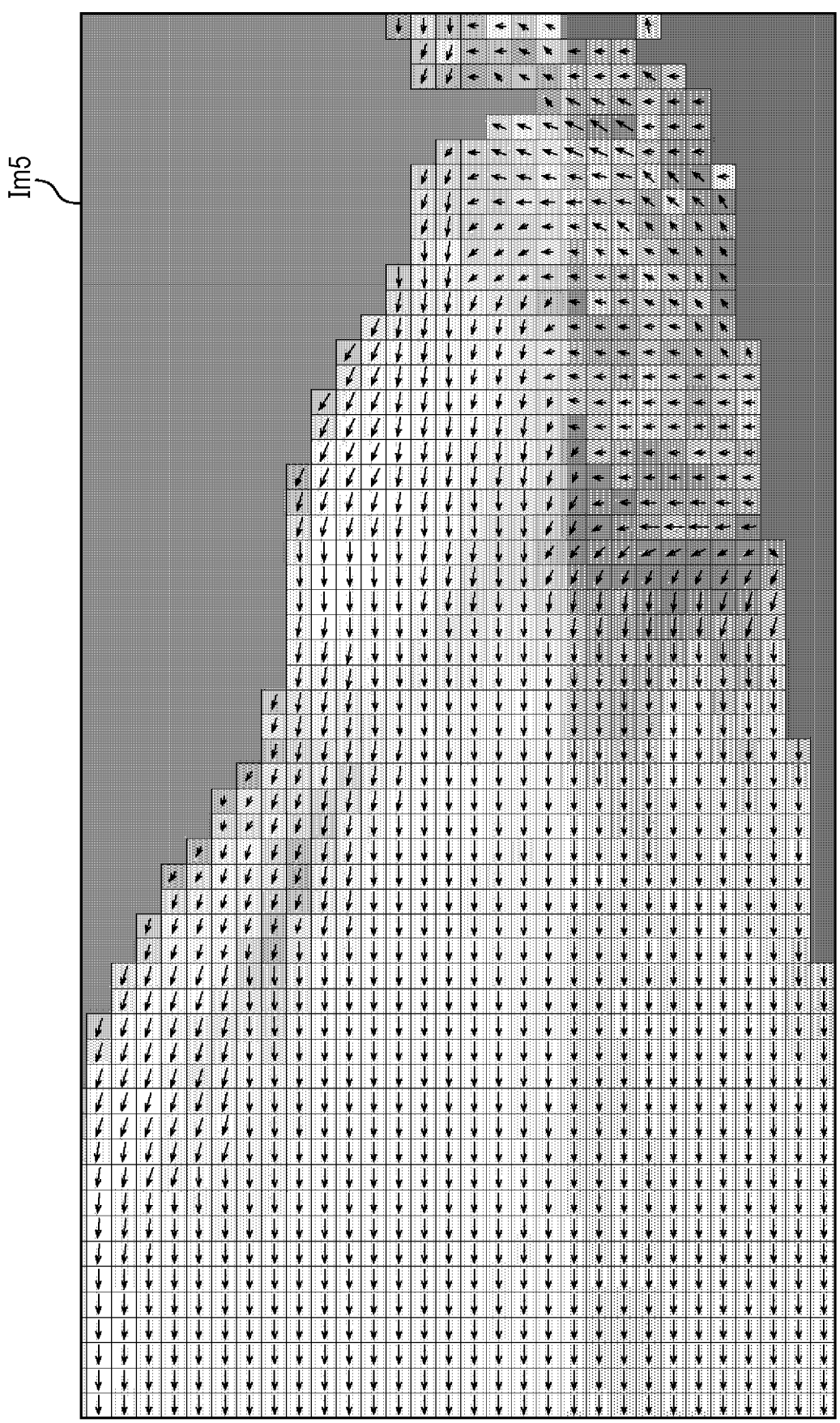
FIG. 7 is an enlarged schematic diagram of a part of the gas region in an image showing optical flow of the images shown in FIG. 4.

Referring to FIG. 4, the vector calculation unit 93 (FIG. 1A) calculates movement vectors of pixels constituting the images Im2 (step S2 in FIG. 2). The details will be described. The vector calculation unit 93 generates optical flow, using two images Im2 at different times. FIG. 7 is an enlarged schematic diagram of a part of the gas region 21 in the image Im5 showing optical flow of the images Im2 shown in FIG. 4. Here, assume that optical flow for movement from the image Im2-1 at the time T1 to the image Im2-4 at the time T4 is generated. An arrow included in each pixel indicates a movement vector of the pixel. The movement vector represents the direction of movement and the amount of movement of the pixel.

The calculation of the movement vectors is not limited to optical flow. The movement vectors may be calculated using, for example, template matching. Template matching includes, for example, the sum of absolute difference (SAD) and normalized cross-correlation (NCC). The calculation of the movement vectors using template matching will be described in detail with the image Im2-1 at the time T1 and the image Im2-2 at the time T2 shown in FIG. 4 as an example. The vector calculation unit 93 performs template matching on a large number of feature points (e.g. edges) included in the image Im2-1 at the time T1, using the image Im2-2 at the time T2, to calculate movement vectors of these feature points. A feature point is a region composed of a plurality of pixels, not one pixel (e.g. five pixels×five pixels). Therefore, the movement vector of a feature point A, for example, is the respective movement vectors of a plurality of pixels constituting the feature point A. In the way described above, the movement vectors of the pixels constituting the image Im2-1 are calculated. Without using feature points such as edges, a region composed of pixels in FIG. 4 may be directly processed.

Figure 8:
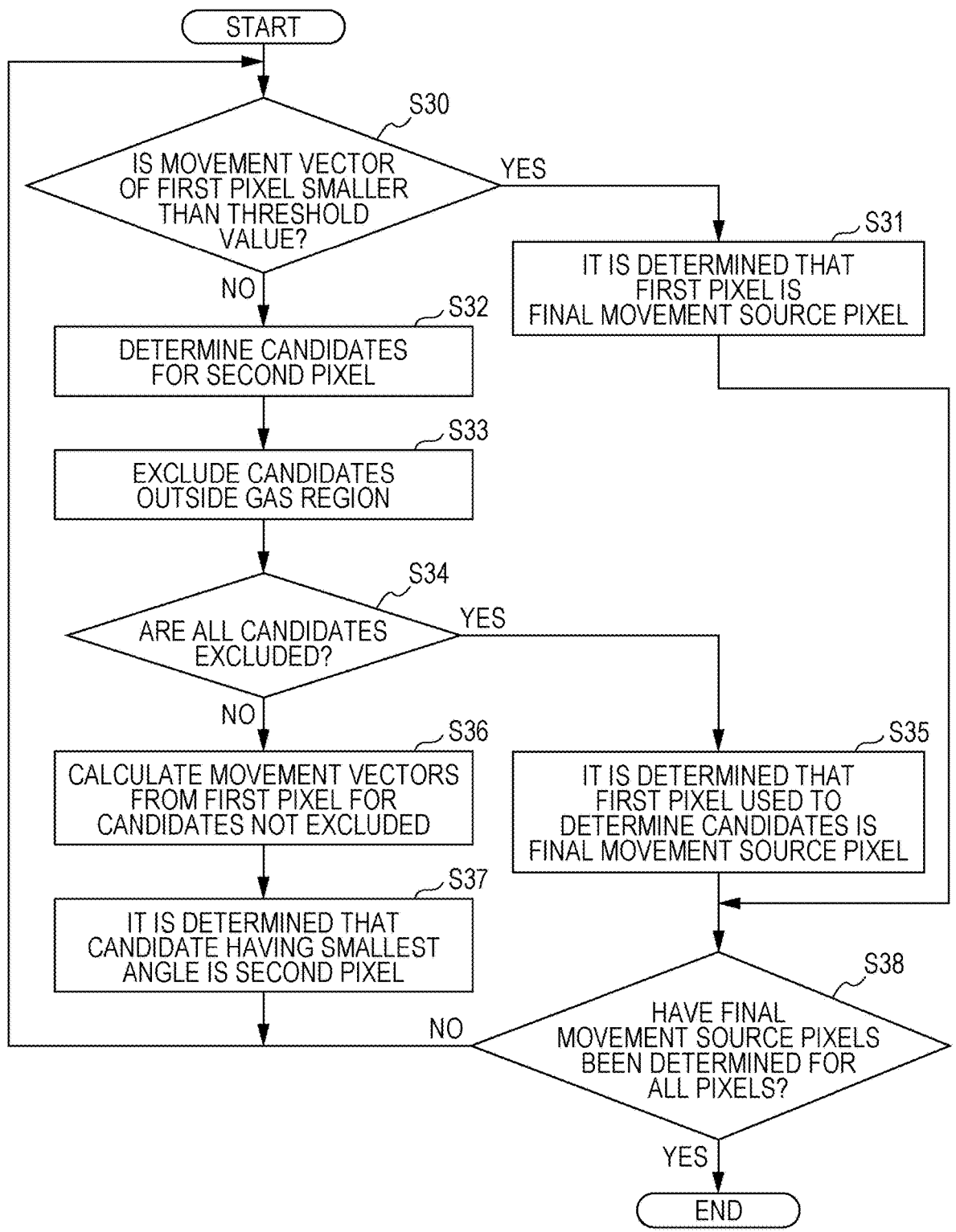
FIG. 8 is a flowchart illustrating tracing of movement source pixels.
Figure 9:
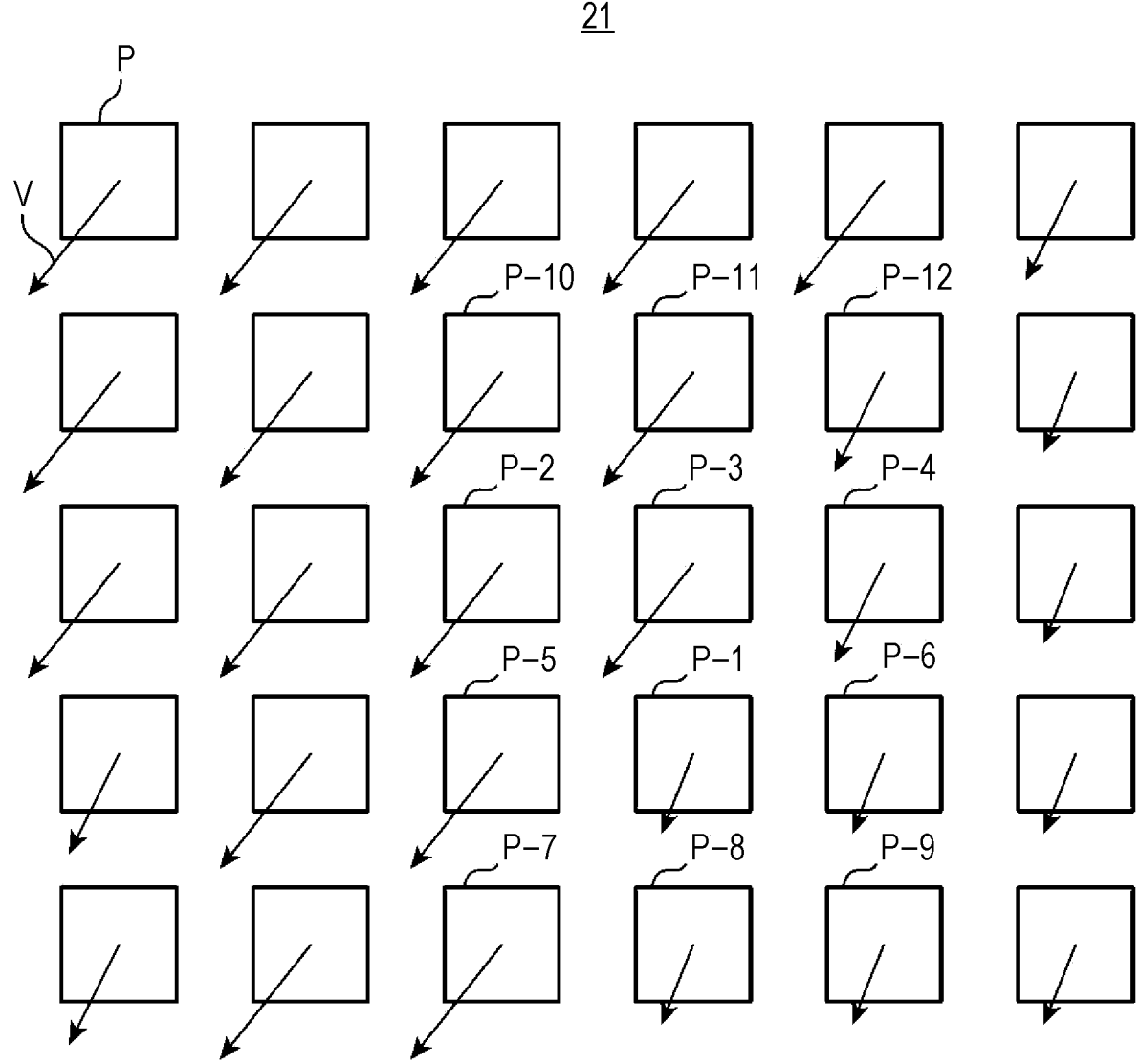
FIG. 9 is a first explanatory diagram illustrating tracing of a movement source pixel.
Figure 10:
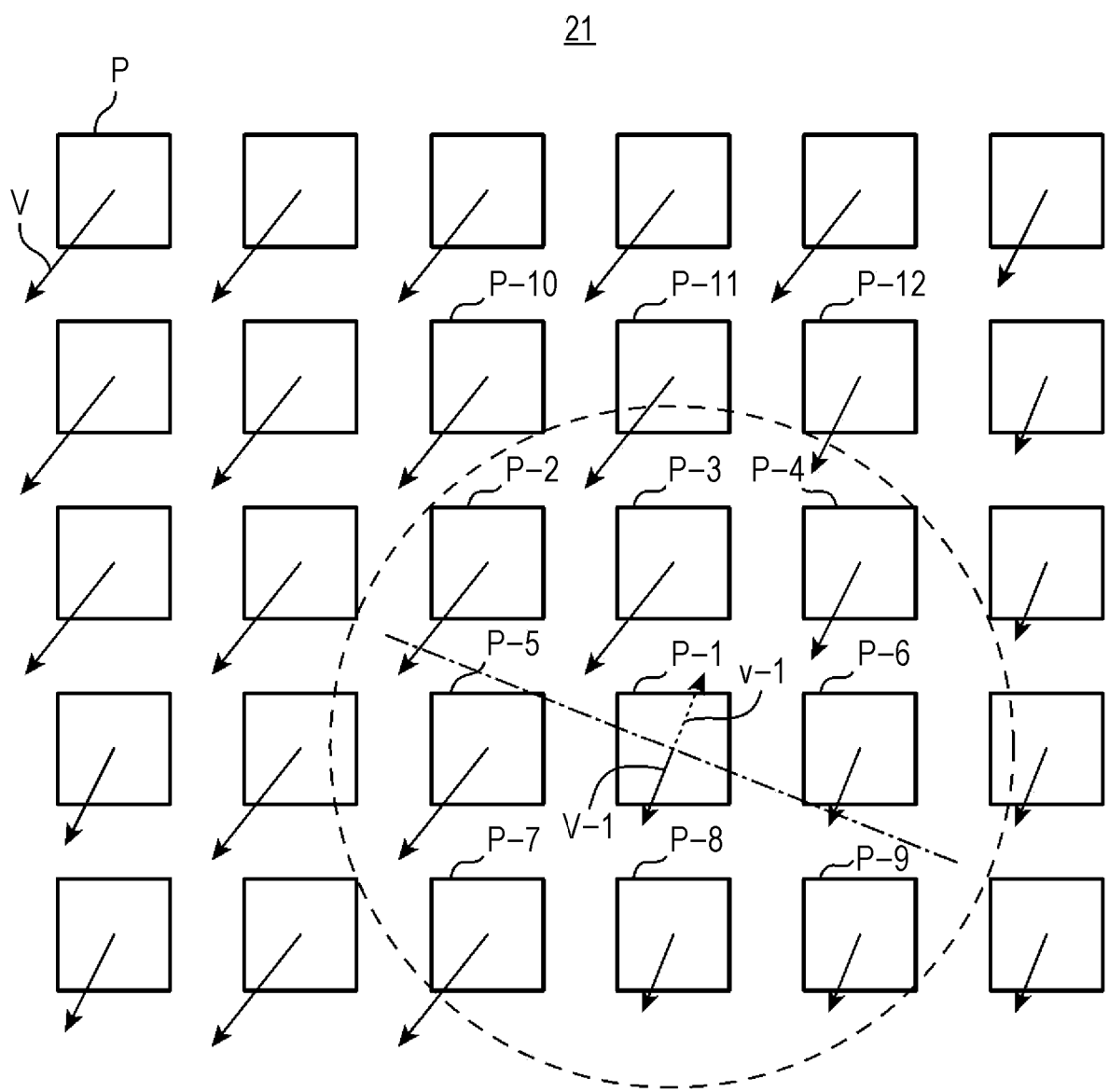
FIG. 10 is a second explanatory diagram illustrating tracing of the movement source pixel.
Figure 11:
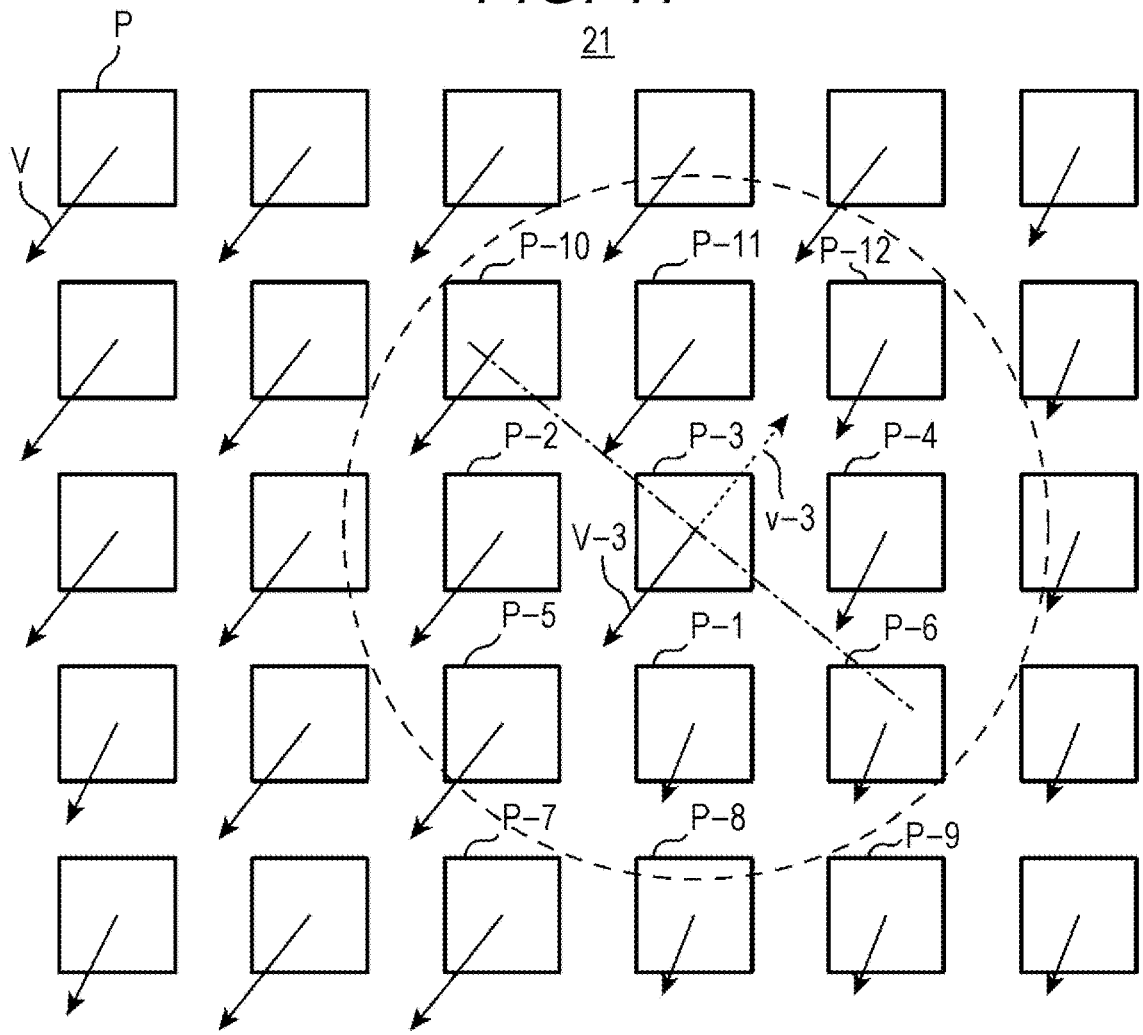
FIG. 11 is a third explanatory diagram illustrating tracing of the movement source pixel.

The pixel determination processing unit 94 (FIG. 1A) traces movement source pixels (step S3 in FIG. 2). FIG. 8 is a flowchart illustrating this. FIG. 9 to FIG. 11 are explanatory diagrams illustrating this, and FIG. 9 is a first explanatory diagram, FIG. 10 is a second explanatory diagram, and FIG. 11 is a third explanatory diagram. FIG. 9 to FIG. 11 are enlarged diagrams of a part of the image Im5 (FIG. 7) showing the optical flow. Space is provided between pixels P for convenience of illustration. The pixels P are arranged in a matrix. Movement vectors V are shown at the pixels P.

The pixel determination processing unit 94 (FIG. 1A) traces movement source pixels for all pixels P constituting the gas region 21 (FIG. 6). With reference to FIG. 8 and FIG. 9, description will be made with a pixel P-1 that is one of the pixels P constituting the gas region 21 as an example. The pixel determination processing unit 94 starts tracing a movement source pixel with the pixel P-1 as a first pixel. The pixel determination processing unit 94 determines whether or not the quantity of the movement vector V of the first pixel (pixel P-1) is smaller than a predetermined threshold value (step S30).

If the quantity of the movement vector (the amount of movement) of the first pixel is smaller, the leak source can be located near the first pixel. Therefore, when the pixel determination processing unit 94 determines that the quantity of the movement vector V of the first pixel (pixel P-1) is smaller than the predetermined threshold value (Yes in step S30), it determines that the first pixel (pixel P-1) is a final movement source pixel (step S31). The predetermined threshold value is, for example, one-tenth of the quantity of the mean movement vector of all the pixels P constituting the gas region 21.

Referring to FIG. 8 and FIG. 10, when the pixel determination processing unit 94 determines that the quantity of the movement vector V of the first pixel (pixel P-1) is greater than or equal to the predetermined threshold value (No in step S30), it calculates the inverse vector v-1 of the movement vector V-1 of the first pixel (pixel P-1). The pixel determination processing unit 94 determines that among eight pixels P (pixels P-2 to P-9) adjacent to the first pixel (pixel P-1), pixels P located within the range of ±90 degrees with respect to an axis indicating the direction of the inverse vector v-1 are candidates for a second pixel (step S32). Pixels P (pixels P-5, P-7, P-8, and P-9) located in the direction of movement of the first pixel (pixel P-1) when viewed from the first pixel are improper as the movement source pixel (second pixel) of the first pixel. Here, assume that it is determined that the pixels P-2, P-3, P-4, and P-6 are candidates for the second pixel.

If there is a candidate located outside the gas region 21 among the candidates (the pixels P-2, P-3, P-4, and P-6), the pixel determination processing unit 94 excludes this candidate (step S33). For example, when the pixel P-2 is located outside the gas region 21, the pixel P-2 is excluded from the candidates. The location of the gas leak source is usually within the gas region 21. If the pixel determination processing unit 94 performs processing to trace the movement source pixel with a pixel P located outside the gas region 21 as the second pixel, the final movement source pixel is highly likely to be significantly distant from the location of the gas leak source. Therefore, the pixel determination processing unit 94 excludes a candidate located outside the gas region 21 from the candidates.

Consider a case where there is only one candidate for the second pixel. If the candidate for the second pixel is improper as the second pixel (for example, a pixel P located outside the gas region 21), the processing to trace the movement source pixel stops here, and cannot approach the location of the leak source. According to the embodiment, in which there are two or more candidates for the second pixel, the processing to trace the movement source pixel can be continued with another candidate as the second pixel.

The pixel determination processing unit 94 determines whether or not all of the candidates (the pixels P-2, P-3, P-4, and P-6) are excluded (step S34). When the pixel determination processing unit 94 determines that all of the candidates are excluded (Yes in step S34), it determines that the first pixel used to determine the candidates (that is, the first pixel paired with the second pixel if the second pixel is determined from among the candidates) is the final movement source pixel (step S35). Since the first pixel is the pixel P-1, the pixel determination processing unit 94 determines that the pixel P-1 is the final movement source pixel.

Figure 12:
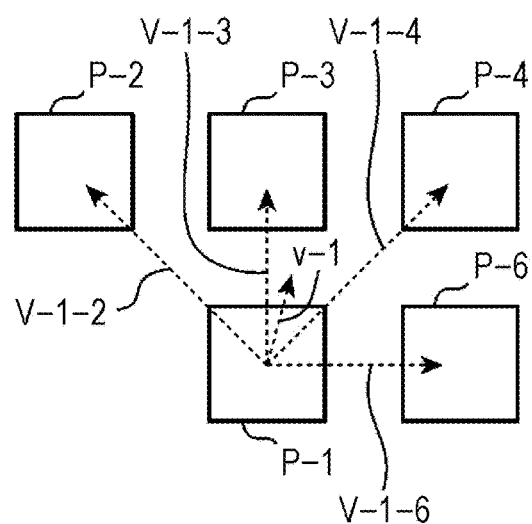
FIG. 12 is an explanatory diagram illustrating movement vectors from a first pixel (pixel P-1).

When the pixel determination processing unit 94 does not determine that all of the candidates are excluded, that is, when it determines that there is a candidate not excluded (No in step S34), it calculates a movement vector V from the first pixel (pixel P-1) for the candidate not excluded (step S36). Here, assume that no candidates are excluded. That is, assume that all of the candidates (the pixels P-2, P-3, P-4, and P-6) are in the gas region 21. Referring to FIG. 12, the pixel determination processing unit 94 calculates a movement vector V-1-2 moving from the pixel P-1 to the pixel P-2, a movement vector V-1-3 moving from the pixel P-1 to the pixel P-3, a movement vector V-1-4 moving from the pixel P-1 to the pixel P-4, and a movement vector V-1-6 moving from the pixel P-1 to the pixel P-6. FIG. 12 is an explanatory diagram illustrating these movement vectors V.

The pixel determination processing unit 94 calculates the angle between the movement vector V-1-2 and the inverse vector v-1, the angle between the movement vector V-1-3 and the inverse vector v-1, the angle between the movement vector V-1-4 and the inverse vector v-1, and the angle between the movement vector V-1-6 and the inverse vector v-1. It is appropriate to consider the candidate having the smallest angle among the calculated angles as the movement source pixel (second pixel) of the first pixel. Thus, the pixel determination processing unit 94 determines that the candidate having the smallest angle among the calculated angles is the second pixel (step S37). Here, it is determined that the pixel P-3 is the second pixel.

In this way, if even a candidate located at the position where the angle between the movement vector V-1-*n* (here, n is 2, 3, 4, or 6) and the inverse vector v-1 (the angle relative to the axis) is the smallest is located outside the gas region 21, the pixel determination processing unit 94 excludes it from the candidates (step S33), and determines that among the remaining candidates, a candidate at the position where the angle between the movement vector V-1-*n* and the inverse vector v-1 is the smallest is the movement source pixel (second pixel) of the first pixel (step S37). Consequently, the tracing of movement source pixels can be prevented from finishing at the edges of the gas region 21, resulting in the concentration of final movement source pixels at the edges.

Thus, a pair of the pixel P-1 (first pixel) and the pixel P-3 (second pixel) is formed. The pixel determination processing unit 94 forms a new pair using the same method as this pair forming method. The details will be described. Referring to FIG. 8 and FIG. 10, the pixel determination processing unit 94 determines whether or not the quantity of the movement vector V of a first pixel (pixel P-3) is smaller than the predetermined threshold value (step S30). When the pixel determination processing unit 94 determines that the quantity of the movement vector V of the first pixel (pixel P-3) is smaller than the predetermined threshold value (Yes in step S30), it determines that the first pixel (pixel P-3) is a final movement source pixel (step S31).

Referring to FIG. 8 and FIG. 11, when the pixel determination processing unit 94 determines that the quantity of the movement vector V of the first pixel (pixel P-3) is greater than or equal to the predetermined threshold value (No in step S30), it calculates the inverse vector v-3 of the movement vector V-3 of the first pixel (pixel P-3). The pixel determination processing unit 94 determines that among eight pixels P (pixels P-10, P-11, P-12, P-2, P-4, P-5, P-1, and P-6) adjacent to the first pixel (pixel P-3), pixels P located within the range of ±90 degrees with respect to an axis indicating the direction of the inverse vector v-3 are candidates for a second pixel (step S32). Here, assume that it is determined that the pixels P-10, P-11, P-12, and P-4 are candidates for the second pixel.

If there is a candidate located outside the gas region 21 among the candidates (the pixels P-10, P-11, P-12, and P-4), the pixel determination processing unit 94 excludes this candidate (step S33).

The pixel determination processing unit 94 determines whether or not all of the candidates (the pixels P-10, P-11, P-12, and P-4) are excluded (step S34). When the pixel determination processing unit 94 determines that all of the candidates are excluded (Yes in step S34), it determines that the first pixel used to select the candidates is a final movement source pixel (step S35). Since the first pixel is the pixel P-3, the pixel determination processing unit 94 determines that the pixel P-3 is the final movement source pixel.

Figure 13:
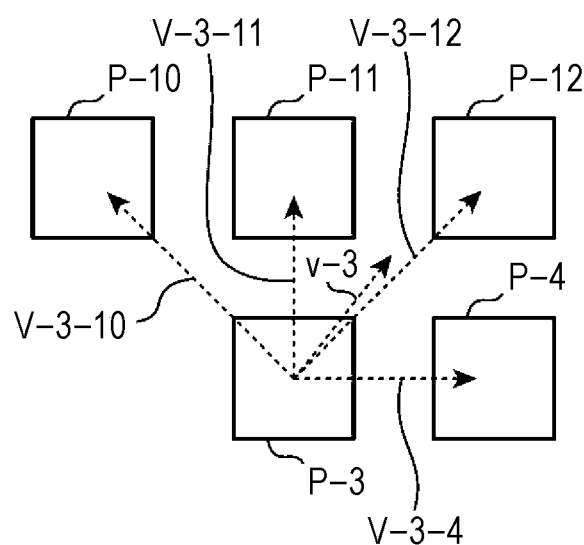
FIG. 13 is an explanatory diagram illustrating movement vectors from a first pixel (pixel P-3).

When the pixel determination processing unit 94 does not determine that all of the candidates are excluded, that is, when it determines that there is a candidate not excluded (No in step S34), it calculates a movement vector V from the first pixel (pixel P-3) for the candidate not excluded (step S36). Here, assume that no candidates are excluded. That is, assume that all of the candidates (the pixels P-10, P-11, P-12, and P-4) are in the gas region 21. Referring to FIG. 13, the pixel determination processing unit 94 calculates a movement vector V-3-10 moving from the pixel P-3 to the pixel P-10, a movement vector V-3-11 moving from the pixel P-3 to the pixel P-11, a movement vector V-3-12 moving from the pixel P-3 to the pixel P-12, and a movement vector V-3-4 moving from the pixel P-3 to the pixel P-4. FIG. 13 is an explanatory diagram illustrating these movement vectors V.

The pixel determination processing unit 94 calculates the angle between the movement vector V-3-10 and the inverse vector v-3, the angle between the movement vector V-3-11 and the inverse vector v-3, the angle between the movement vector V-3-12 and the inverse vector v-3, and the angle between the movement vector V-3-4 and the inverse vector v-3. The pixel determination processing unit 94 determines that the candidate having the smallest angle among the calculated angles is the second pixel (step S37). Here, it is determined that the pixel P-12 is the second pixel.

Figure 14:
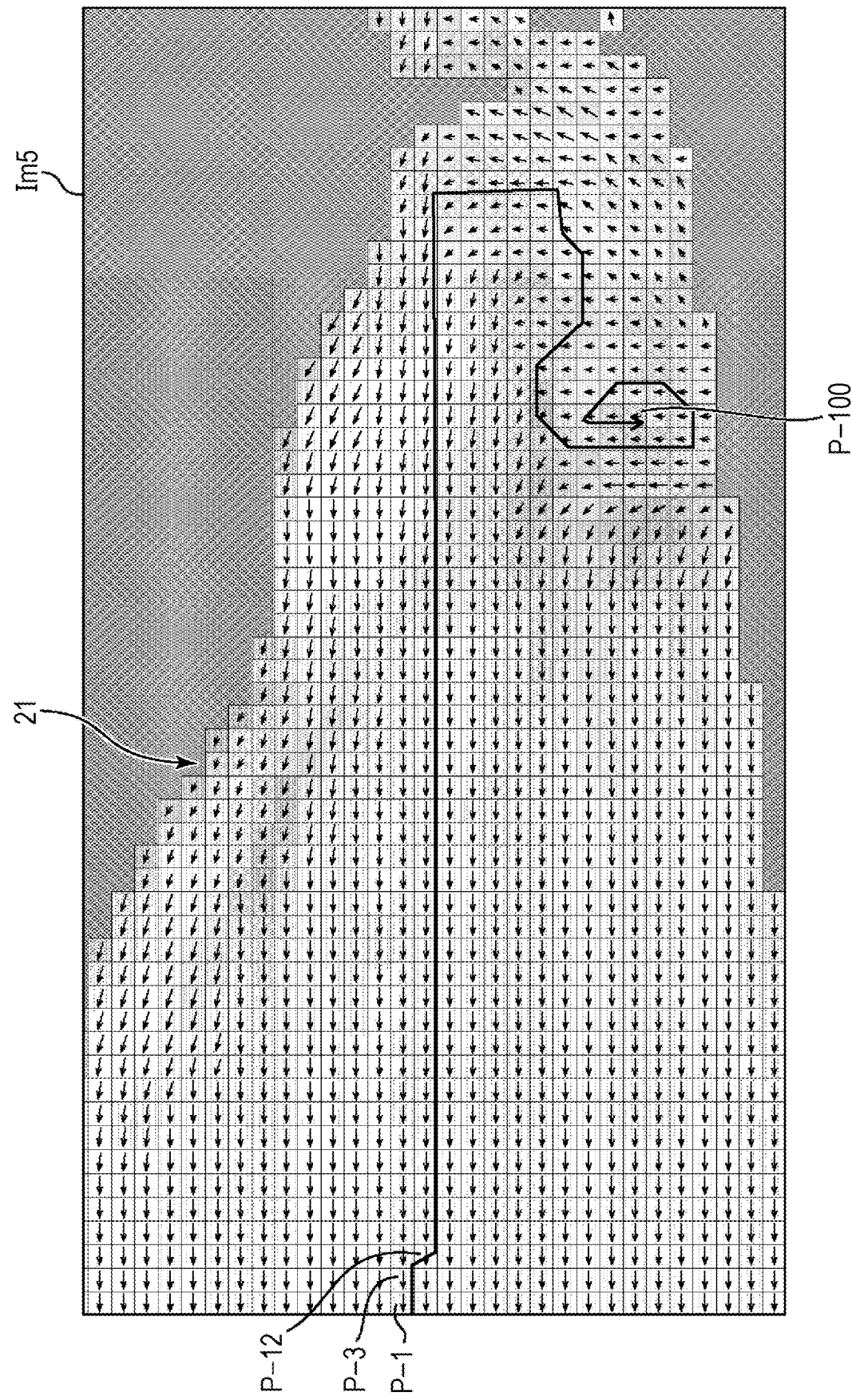
FIG. 14 is an explanatory diagram illustrating a result of tracing movement source pixels for the pixel P-1 in the image shown in FIG. 7.

Thus, a pair of the pixel P-3 (first pixel) and the pixel P-12 (second pixel) is formed. The pixel determination processing unit 94 repeats the pair formation processing to trace movement source pixels until a final movement source pixel is determined (step S31 or step S35). FIG. 14 is an explanatory diagram illustrating a result of tracing movement source pixels for the pixel P-1 in the image Im5 shown in FIG. 7. The final movement source pixel of the pixel P-1 is a pixel P-100.

Referring to FIG. 8, when the final movement source pixel is determined (step S31 or step S35), the pixel determination processing unit 94 determines whether or not final movement source pixels have been determined for all the pixels P in the gas region 21 (step S38). When it is determined that final movement source pixels have not been determined for all the pixels P in the gas region 21 (No in step S38), the pixel determination processing unit 94 performs the processing in steps S30 to S37 on a pixel P whose final movement source pixel has not been determined.

When the pixel determination processing unit 94 determines that final movement source pixels have been determined for all the pixels P in the gas region 21 (Yes in step S38), the tracing of movement source pixels (step S3 in FIG. 2) is completed. The leak source estimation unit 95 (FIG. 1A) estimates the location of the gas leak source (step S4 in FIG. 2). This will be described in detail. FIG. 15 is an explanatory diagram illustrating the relationship between each pixel P in the gas region 21 and the final movement source pixel in the image Im5 shown in FIG. 7. By connecting each pixel P in the gas region 21 and the final movement source pixel with a straight line, the relationship between each pixel P in the gas region 21 and the final movement source pixel is shown. If straight lines are shown for all the pixels P in the gas region 21, the drawing will become difficult to see. Thus, straight lines are shown for some pixels P in the gas region 21.

If there is more than one final movement source pixel, the most frequent final movement source pixel is highly likely to be the location of the leak source. Thus, the leak source estimation unit 95 estimates that among the respective final movement source pixels of all the pixels P in the gas region 21, the most frequent final movement source pixel is the location of the gas leak source. For example, assume that the final movement source pixels are the pixel P-100 and a pixel P-101. The leak source estimation unit 95 compares the number of pixels P whose final movement source pixels are the pixel P-100 with the number of pixels P whose final movement source pixels are the pixel P-101, and estimates that the larger one is the location of the gas leak source. In the case of FIG. 15, it is estimated that the pixel P-100 is the location of the gas leak source.

The main effects of the embodiment will be described. Referring to FIG. 8 and FIG. 14, the pixel determination processing unit 94 repeats the processing to determine the second pixel that is the movement source pixel of the first pixel (in other words, repeats the processing to determine a pair of the first pixel and the second pixel), based on the movement vector V of the first pixel (movement of the first pixel) in the image Im5 including the gas region 21, to trace the movement source pixels and determine the final movement source pixel. The starting point of the flow of the leaking gas is the gas leak source. Thus, by tracing the movement source pixels, the location of the gas leak source can be approached, and the final movement source pixel can indicate the location of the gas leak source.

The leak source estimation unit 95 estimates the gas leak source based on the final movement source pixels of all the pixels P in the gas region 21 (step S4 in FIG. 2). The user can specify the gas leak source using this estimation. Thus, according to the embodiment, it is possible to relatively easily assist the specification of the gas leak source based on the image Im5 including the gas region 21.

The embodiment does not reproduce in reverse a video composed of frame including the gas region 21 and perform image processing on the video, but performs image processing on the image Im5 (still image) including the gas region 21. Thus, according to the embodiment, the amount of image processing can be reduced, so that the speed of image processing can be improved.

A modification of the embodiment will be described. In the embodiment, the single image Im5 showing the optical flow is used. In the modification, two or more images Im5 showing optical flow at different times (two or more images showing pixel movements at different times) are used. For example, the pixel determination processing unit 94 performs the processing in steps S2 and S3 shown in FIG. 2 on the image Im5 (FIG. 7) showing optical flow for movement from the image Im2-1 at the time T1 to the image Im2-2 at the time T2 shown in FIG. 4, and performs the processing in steps S2 and S3 on an image Im5-1 (not shown) showing optical flow for movement from the image Im2-2 at the time T2 to the image Im2-3 at the time T3 shown in FIG. 4. That is, the pixel determination processing unit 94 performs the determination of a final movement source pixel for each of all the pixels P (a plurality of pixels P) in the gas region 21, on each of two or more images showing the movements of the pixels P at different times.

The leak source estimation unit 95 estimates that among the final movement source pixels obtained from the image Im5 (FIG. 7) showing the optical flow and the final movement source pixels obtained from the image Im5-1 (not shown) showing the optical flow, the most frequent final movement source pixel is the location of the gas leak source. That is, the leak source estimation unit 95 estimates that among final movement source pixels obtained for each of two or more images, the most frequent final movement source pixel is the location of the leak source.

The modification, in which two or more images showing the movements of the pixels P at different times are used, allows an improvement in the accuracy of estimating the location of a gas leak source as compared with the case of using one image.

Summary of Embodiment

A leak source specification assistance device according to a first aspect of the embodiment includes a processing unit that performs processing, based on a movement of a first pixel that is one of pixels constituting an image including a leaking fluid region, to determine a second pixel that is one of the pixels constituting the image and is a movement source pixel of the first pixel, and repeats the processing with the second pixel newly set as the first pixel to determine a final movement source pixel. The processing unit repeats the processing on each of a plurality of the pixels constituting the image to determine the final movement source pixel for each of the plurality of pixels.

The leaking fluid may be a gas or a liquid. The second pixel is desirably located in the vicinity of the first pixel. For example, there may be no pixel between the first pixel and the second pixel, or there may be a few pixels between the first pixel and the second pixel.

The processing unit repeats the processing to determine the second pixel that is the movement source pixel of the first pixel (in other words, repeats the processing to determine a pair of the first pixel and the second pixel), based on the movement of the first pixel (e.g. a movement vector of the first pixel) in the image including the leaking fluid region, to trace the movement source pixels and determine the final movement source pixel. The starting point of the flow of the leaking fluid is the leak source. Thus, by tracing the movement source pixels, the location of the leak source can be approached, and the final movement source pixel can indicate the location of the leak source.

The processing unit determines the final movement source pixel for each of the plurality of pixels constituting the image including the leaking fluid region (the plurality of pixels may be, for example, all pixels in the image, pixels selected from among all the pixels in the image, all pixels in the leaking fluid region, or pixels selected from among all the pixels in the leaking fluid region). The number of the final movement source pixels is less than or equal to the number of the plurality of pixels. For example, assume that the plurality of pixels is three pixels. The final movement source pixels of the three pixels may be different from each other or may be the same, or the final movement source pixels of two of the three pixels may be the same.

The user may specify the leak source using the respective final movement source pixels of the plurality of pixels, or as described below, the leak source specification assistance device may estimate the leak source based on the respective final movement source pixels of the plurality of pixels. The user can specify the leak source using this estimation.

As described above, the leak source specification assistance device according to the first aspect of the embodiment can relatively easily assist the specification of a leak source based on an image including a leaking fluid region.

In the above configuration, the processing unit determines that two or more of the pixels located within a predetermined angle range with respect to an axis indicating a direction opposite to a direction of the movement of the first pixel are candidates for the second pixel, and determines the second pixel from among the candidates.

There is an improper pixel as the second pixel. For example, it is a pixel located outside the leaking fluid region. Consider a case where there is only one candidate for the second pixel. If the candidate for the second pixel is improper as the second pixel, the processing to trace the movement source pixel stops here, and cannot approach the location of the leak source. According to this configuration, there are two or more candidates for the second pixel, so that the processing to trace the movement source pixel can be continued with another candidate as the second pixel.

Candidates for the second pixel are two or more pixels located within the predetermined angle range with respect to the axis indicating the direction opposite to the direction of the movement of the first pixel. The reason for this is that pixels located in the direction of the movement of the first pixel when viewed from the first pixel are improper as the movement source pixel (second pixel) of the first pixel. The predetermined angle range is, for example, the range of ±90 degrees with respect to the axis indicating the opposite direction.

In the above configuration, the processing unit determines that one of the candidates located at the position where the angle with respect to the axis is the smallest is the second pixel.

It is appropriate to consider the candidate located at the position where the angle with respect to the axis indicating the direction opposite to the direction of the movement of the first pixel is the smallest among the candidates for the second pixel, as the movement source pixel (second pixel) of the first pixel. In this configuration, it is determined that the candidate is the second pixel.

In the above configuration, the processing unit excludes, among the candidates, the candidate(s) located outside the leaking fluid region from the candidates.

The location of the leak source is usually within the leaking fluid region. If the processing unit performs the processing to trace the movement source pixel with a pixel located outside the leaking fluid region as the second pixel, the final movement source pixel is highly likely to be significantly distant from the location of the leak source. Therefore, in this configuration, among the candidates for the second pixel, a candidate located outside the leaking fluid region is excluded from the candidates.

A combination of this configuration and the configuration to determine that the candidate located at the position where the angle with respect to the axis is the smallest is the second pixel produces the following functions and effects. According to this combination, if even a candidate located at the position where the angle with respect to the axis is the smallest is located outside the leaking fluid region, it is excluded from the candidates, and it is determined that among the remaining candidates, a candidate located at the position where the angle with respect to the axis is the smallest is the movement source pixel (second pixel) of the first pixel. Consequently, the tracing of movement source pixels can be prevented from finishing at the edges of the leaking fluid region, resulting in the concentration of final movement source pixels at the edges.

In the above configuration, when all of the candidates are located outside the leaking fluid region, the processing unit determines that the first pixel used to determine the candidates is the final movement source pixel.

It is improper to set a candidate located outside the leaking fluid region as the second pixel. Thus, when all of the candidates are located outside the leaking fluid region, the processing unit determines that the first pixel used to determine these candidates (that is, the first pixel paired with the second pixel if the second pixel is selected from among the candidates) is the final movement source pixel.

In the above configuration, when the amount of the movement of the first pixel is smaller than a predetermined threshold value, the processing unit determines that the first pixel is the final movement source pixel.

If the amount of the movement of the first pixel is smaller, the leak source can be located near the first pixel. Therefore, in that case, the processing unit determines that the first pixel is the final movement source pixel. The predetermined threshold value is, for example, one-tenth of the quantity of the mean movement vector of all the pixels constituting the leaking fluid region.

The above configuration further includes an estimation unit that estimates that among the respective final movement source pixels of the plurality of pixels constituting the image, the most frequent final movement source pixel is the location of a leak source.

If there is more than one final movement source pixel, the most frequent final movement source pixel is highly likely to be the location of the leak source. Therefore, the estimation unit estimates that the most frequent final movement source pixel is the location of the leak source.

In the above configuration, the processing unit performs the determination of the final movement source pixel for each of the plurality of pixels constituting the image, on each of a plurality of the images showing movements of the pixels at different times, and the estimation unit estimates that the most frequent final movement source pixel among the final movement source pixels obtained for each of the plurality of images is the location of the leak source.

The plurality of images showing the movements of the pixels at different times will be described with a specific example. For example, for an image showing optical flow generated using an image captured at a time T1 and an image captured at a time T2, and an image showing optical flow generated using an image captured at the time T2 and an image captured at a time T3, the two images showing the optical flow are the plurality of images showing the movements of the pixels at different times.

This configuration, in which the plurality of images showing the movements of the pixels at different times is used, allows an improvement in the accuracy of estimating the location of the leak source as compared with the case of using one image.

A leak source specification assistance method according to a second aspect of the embodiment includes a processing step of performing processing, based on a movement of a first pixel that is one of pixels constituting an image including a leaking fluid region, to determine a second pixel that is one of the pixels constituting the image and is a movement source pixel of the first pixel, and repeating the processing with the second pixel newly set as the first pixel to determine a final movement source pixel. In the processing step, the processing is repeated on each of a plurality of the pixels constituting the image to determine the final movement source pixel for each of the plurality of pixels.

The leak source specification assistance method according to the second aspect of the embodiment defines the leak source specification assistance device according to the first aspect of the embodiment in terms of a method, and has the same functions and effects as the leak source specification assistance device according to the first aspect of the embodiment.

A leak source specification assistance program according to a third aspect of the embodiment causes a computer to execute a processing step of performing processing, based on a movement of a first pixel that is one of pixels constituting an image including a leaking fluid region, to determine a second pixel that is one of the pixels constituting the image and is a movement source pixel of the first pixel, and repeating the processing with the second pixel newly set as the first pixel to determine a final movement source pixel. In the processing step, the processing is repeated on each of a plurality of the pixels constituting the image to determine the final movement source pixel for each of the plurality of pixels.

The leak source specification assistance program according to the third aspect of the embodiment defines the leak source specification assistance device according to the first aspect of the embodiment in terms of a program, and has the same functions and effects as the leak source specification assistance device according to the first aspect of the embodiment.

Although the embodiment of the present invention has been illustrated and described in detail, it is merely an illustration and an example and is not limiting. The scope of the present invention should be interpreted in terms of the wording of the accompanying claims.

The entire disclosure of Japanese Patent Application No. 2018-221215 filed on Nov. 27, 2018 is incorporated herein by reference in its entirety.

INDUSTRIAL APPLICABILITY

According to the present invention, a leak source specification assistance device, a leak source specification assistance method, and a leak source specification assistance program can be provided.

The invention claimed is:

1. A leak source specification assistance device, comprising a hardware processor that performs processing, based on a movement of a first pixel that is one of pixels constituting an image including a leaking fluid region, to determine a second pixel that is one of the pixels constituting the image and is a movement source pixel of the first pixel, and repeats the processing with the second pixel newly set as the first pixel to determine a final movement source pixel,
wherein the hardware processor repeats the processing on each of a plurality of the pixels constituting the image to determine the final movement source pixel for each of the plurality of pixels;
wherein the hardware processor determines that two or more of the pixels located within a predetermined angle range with respect to an axis indicating a direction opposite to a direction of the movement of the first pixel are candidates for the second pixel, and determines the second pixel from among the candidates.

2. The leak source specification assistance device according to claim 1, wherein the predetermined angle range is a range of ±90 degrees with respect to the axis.

3. The leak source specification assistance device according to claim 1, wherein the hardware processor determines that one of the candidates located at a position where an angle with respect to the axis is the smallest is the second pixel.

4. The leak source specification assistance device according to claim 1, wherein the hardware processor excludes, among the candidates, the candidate(s) located outside the leaking fluid region from the candidates.

5. The leak source specification assistance device according to claim 4, wherein when all of the candidates are located outside the leaking fluid region, the hardware processor determines that the first pixel used to determine the candidates is the final movement source pixel.

6. The leak source specification assistance device according to claim 1, wherein when an amount of the movement of the first pixel is smaller than a predetermined threshold value, the hardware processor determines that the first pixel is the final movement source pixel.

7. The leak source specification assistance device according to claim 1, wherein the plurality of pixels constituting the image is all pixels constituting the leaking fluid region.

8. The leak source specification assistance device according to claim 1, wherein the hardware processor estimates that among the respective final movement source pixels of the plurality of pixels constituting the image, the most frequent final movement source pixel is the location of a leak source.

9. The leak source specification assistance device according to claim 8, wherein
the hardware processor performs the determination of the final movement source pixel for each of the plurality of pixels constituting the image, on each of a plurality of the images showing movements of the pixels at different times, and
the hardware processor estimates that the most frequent final movement source pixel among the final movement source pixels obtained for each of the plurality of images is the location of the leak source.

10. A leak source specification assistance method, comprising performing processing, based on a movement of a first pixel that is one of pixels constituting an image including a leaking fluid region, to determine a second pixel that is one of the pixels constituting the image and is a movement source pixel of the first pixel, and repeating the processing with the second pixel newly set as the first pixel to determine a final movement source pixel,
wherein in the performing processing, the processing is repeated on each of a plurality of the pixels constituting the image to determine the final movement source pixel for each of the plurality of pixels;
wherein the processing determines that two or more of the pixels located within a predetermined angle range with respect to an axis indicating a direction opposite to a direction of the movement of the first pixel are candidates for the second pixel, and determines the second pixel from among the candidates.

11. A non-transitory recording medium storing a computer readable leak source specification assistance program that causes a computer to execute a-performing processing, based on a movement of a first pixel that is one of pixels constituting an image including a leaking fluid region, to determine a second pixel that is one of the pixels constituting the image and is a movement source pixel of the first pixel, and repeating the processing with the second pixel newly set as the first pixel to determine a final movement source pixel, wherein in the performing processing, the processing is repeated on each of a plurality of the pixels constituting the image to determine the final movement source pixel for each of the plurality of pixels;

wherein the processing determines that two or more of the pixels located within a predetermined angle range with respect to an axis indicating a direction opposite to a direction of the movement of the first pixel are candidates for the second pixel, and determines the second pixel from among the candidates.

12. The leak source specification assistance device according to claim 1, wherein when an amount of the movement of the first pixel is smaller than a predetermined threshold value, the hardware processor determines that the first pixel is the final movement source pixel.

13. The leak source specification assistance device according to claim 1, wherein the plurality of pixels constituting the image is all pixels constituting the leaking fluid region.

14. The leak source specification assistance device according to claim 1, wherein the hardware processor estimates that among the respective final movement source pixels of the plurality of pixels constituting the image, the most frequent final movement source pixel is the location of a leak source.

15. The leak source specification assistance device according to claim 2, wherein the hardware processor determines that one of the candidates located at a position where an angle with respect to the axis is the smallest is the second pixel.

16. The leak source specification assistance device according to claim 2, wherein the hardware processor excludes, among the candidates, the candidate(s) located outside the leaking fluid region from the candidates.

17. The leak source specification assistance device according to claim 2, wherein when an amount of the movement of the first pixel is smaller than a predetermined threshold value, the hardware processor determines that the first pixel is the final movement source pixel.

18. The leak source specification assistance device according to claim 2, wherein the plurality of pixels constituting the image is all pixels constituting the leaking fluid region.

19. The leak source specification assistance device according to claim 2, wherein the hardware processor estimates that among the respective final movement source pixels of the plurality of pixels constituting the image, the most frequent final movement source pixel is the location of a leak source.

* * * * *